United States Patent [19]
Komatsu et al.

[11] Patent Number: 4,787,246
[45] Date of Patent: Nov. 29, 1988

[54] BIDIRECTIONAL SHOCK SENSOR

[75] Inventors: Tomoaki Komatsu; Hiroshi Yamaguchi, both of Tokyo, Japan

[73] Assignee: Fuji Photo Film Co., Ltd., Kanagawa, Japan

[21] Appl. No.: 19,813

[22] Filed: Feb. 27, 1987

[30] Foreign Application Priority Data

Feb. 27, 1986 [JP] Japan .............................. 61-026515[U]

[51] Int. Cl.<sup>4</sup> ............................................. G01P 15/04
[52] U.S. Cl. ................................... 73/492; 73/862.53
[58] Field of Search ..................... 73/492, 762, 862.53; 116/203

[56] References Cited

U.S. PATENT DOCUMENTS

| | | | |
|---|---|---|---|
| 2,976,732 | 3/1961 | Hautly | 73/402 |
| 3,071,973 | 1/1963 | Helfand | 73/492 |
| 3,782,204 | 1/1974 | Boardman | 73/492 |
| 4,142,404 | 3/1979 | Ogata et al. | 73/862.53 X |

Primary Examiner—Charles A. Ruehl
Attorney, Agent, or Firm—Sughrue, Mion, Zinn, Macpeak, and Seas

[57] ABSTRACT

A bidirectional shock sensor in which a slidable weight is slidably fit in a container. Elastic projections on the ends of the weight face pressure-sensitive sheets placed on the walls of the container so as to record the impact acceleration of the weight. The pressure-sensitive sheet can be fixed to a transparent developer sheet so that the impact record can be immediately viewed through transparent walls of the container.

5 Claims, 2 Drawing Sheets

BIDIRECTIONAL SHOCK SENSOR

BACKGROUND OF THE INVENTION

1. Field of the Invention

The present invention relates to a device for simply detecting not only the impact of an external force on a packed article during transport of commercial goods but also the direction of the external force. More particularly, the invention relates to a bidirectional shock sensor for proving the occurrence of an accident due to an inclination, tumbling, dropping impact or the like during the transportation of cargo and for proving who is responsible for the accident.

2. Background Art

A simple device, in which the inversion or tilt in a cargo during its transportation is detected in terms of the movement of a detector housed in a special container, was disclosed in the U.S. Pat. No. 3,688,734.

A device for showing receipt of predetermined shock was disclosed in another U.S. Pat. No. 4,068,613.

In these conventional devices, the measurement of an impulsive force is discontinuous, the equipment is complicated and has a large size, and its cost is therefore high. For that reason, the development of an impact detector of simple construction, low cost and high performance has been strongly needed.

SUMMARY OF THE INVENTION

An object of the present invention is to provide a bidirectional shock sensor of low cost and easy installation, which more accurately detects a bidirectional impulsive force in upward and downward directions, or forward and backward directions depending on the packed state in a cargo.

The invention can be summarized as a bidirectional shock sensor in which a weight is slidably fit inside a container. On opposed free ends of the weight are placed elastic members including a conical projection and surrounding triangular projections. On interior surfaces of the container are placed pressure sensitive sheets which are self-devloping. The portions of the container around the pressure-sensitive sheets are transparent to allow viewing of density changes. When the detector is accelerated, at least one of the elastic members impacts the pressure-sensitive sheet and causes it to change density.

DETAILED DESCRIPTION OF THE PREFERRED EMBODIMENTS

Figure 1:
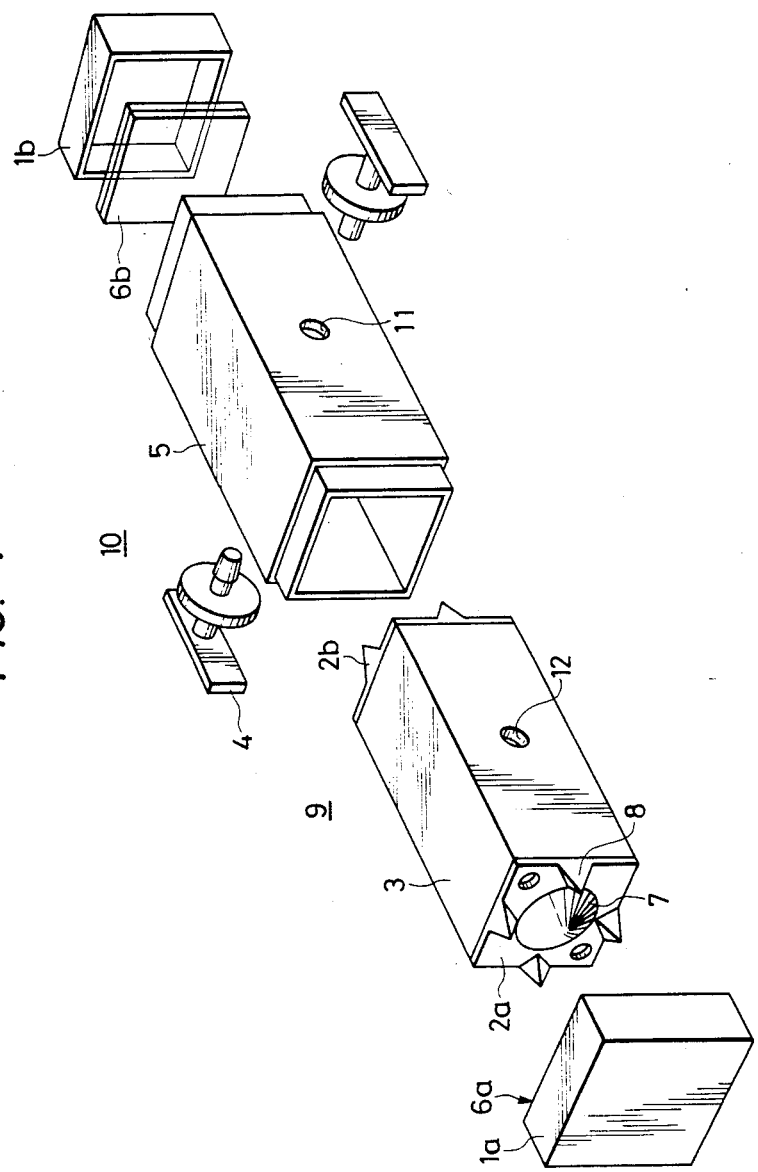
FIG. 1 shows a perspective exploded view of a bidirectional shock sensor which is an embodiment of the present invention.

According to the invention, the impulsive force is received by a pressure-sensitive sheets to detect the impulsive force. The detector comprises an impact block provided with elastic members having projections. The impact block is disposed on both end faces of a rodlike weight. The side surfaces of the impact block are movably fitted on inner walls of a container. The pressuresensitive sheets are set on these inner walls facing the elastic members on both the end faces of the impact block. Stopper pins connect the impact block to the container. The inner walls of the container, on which the pressure-sensitive sheets are set, and the carriers of developer sheets which are portions of the pressure-sensitive sheets, are made transparent so that impact load can be immediately measured.

The rodlike weight of the impact block may have an appropriate form such as a cylinder or a prism. The weight is made of a heavy metal such as lead.

The elastic members which have the projections and which are disposed on both end faces of the weight are made of natural rubber, synthetic rubber, elastic plastic, silicone or the like. Although the projections of each elastic member may differ in size, form, number and so forth, the simplest and surest elastic member is one having a concial projection provided on one side of the elastic member and also having triangular pyramidal projections surrounding the conical projection for lightly holding the pressure-sensitive sheet.

The container for the impact block includes the inner walls having such a clearance to the side surfaces of the impact block so as to movably fit the impact block on the inner walls. The pressure-sensitive sheets are set on inner end walls of the container facing the elastic members on both end faces of the impact block. The outside surface of the container may have any form as long as the bidirectional shock sensor can be reliably installed. From a viewpoint of molding, it is preferable to make the container of a plastic. Both the end portions of the container, on which the pressure-sensitive sheets are set, are made of removable caps so as to facilitate both the insertion of the impact block into the container and the replacement of the pressure-sensitive sheets. The caps are made of a transparent plastic so that the change in the density of each pressure-sensitive sheet can be directly observed from outside to quickly detect the impact load.

From a viewpoint of ease of use, it is preferable that pin holes are provided in the container, that pin fixation holes are provided in the impact block and that the stopper pins are fitted in these holes to connect the impact block to the container from outside the container.

Each of the pressure-sensitive sheets for measurement of pressure may be a commercial product such as what is generally called pressure-sensitive recording paper of non-carbon paper. In this type of paper, microcapsules containing a coupler and a developer are provided on the carrier. This paper shows a proportional relation between the pressure on the sheet and the optical shade of its color within the range of the pressure measurement. It is preferable that a developer sheet (C film) having a transparent plastic as a carrier and a color former containing sheet (A film) having paper or a film as a carrier are combined with each other to constitute the pressure-sensitive sheet. Such a construction enables the observation of the sheet from outside. The combination of such color former containing sheet and developer sheet is specifically described in the Japanese Utility Application (OUI) No. 149710/77 (the term "OUI" as used herein means an "unexamined published application").

When the bidirectional shock sensor provided according to the present invention is put in use, the detector is attached to the package of the cargo so that the direction of action of the impact block is coincident with a direction in which it needs to be observed in order to determine whether or not the impact load affects the cargo. If the impact load acts on the cargo, the impact block of the sensor is given an acceleration due to the impact load to push the conical projection of the elastic member onto the pressure-sensitive sheet to color the sheet as a result. Since the triangular pyramidal projections are more flexible than the conical projection, the triangular pyramidal projections can serve to detect a vibration or a low impulsive force. When the detector is not in use, the impact block is immovably held by the stopper pins so that each pressure-sensitive sheet does not receive any impact from the impact block even if an external impact acts to the detector.

Since the walls of the portions of the container, on which the pressure-sensitive sheets are set, are made of a transparent material, the change in the density in each pressure-sensitive sheet can be observed and measured from outside the detector.

The bidirectional shock sensor can accurately detect an impulsive force in either of two mutually opposed directions. It is easy to install the detector. The cost of the detector is low.

A specific embodiment of a bidirectional shock sensor of the present invention is hereafter described with reference to the drawings. The present invention is, however, not confined to this embodiment.

Figure 2:
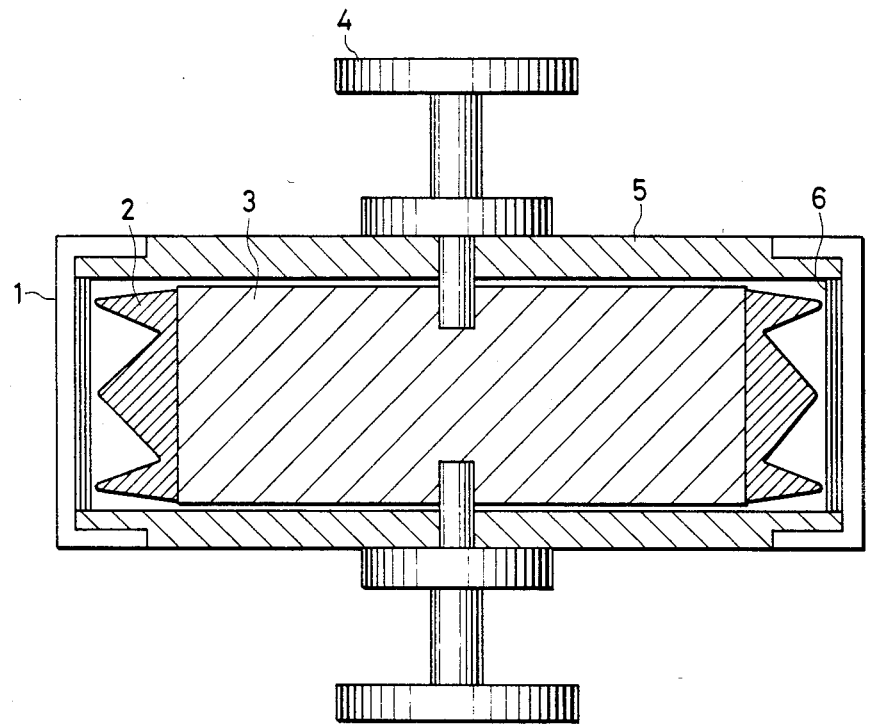
FIG. 2 shows a longitudinally sectional view of the detector not in use.

FIG. 1 shows a perspective exploded view of the bidirectional shock sensor. FIG. 2 shows a longitudinally sectional view of the detector not in use. In the detector, an impact block 9 has two opposed elastic members 2a and 2b, each made of silicone and having a conical projection 7 in the center and triangular pyramidal projections 8 located along four sides of a weight 3 made of lead. The weight 3 is shaped as a rod of rectangular cross sections and the two elastic members 2a and 2b are provided on both the end faces of the weight 3. A container body 5 is made of a plastic. The side surfaces of the impact block 9 are movably fitted within the container body. Caps 1a and 1b (which constitute portions of the inner walls of a container 10) are made of transparent acrylic resin. Pressure-sensitive sheets 6a and 6b are set on the interior surfaces of the caps 1a and 1b facing the elastic members 2a and 2b on both the end faces of the impact block 9. Removable stopper pins 4 made of a plastic can be used to connect the impact block 9 to the container 10. Pin holes 11 are provided in the container body 5 to receive the stopper pins 4. Pin fixation holes 12 provided in the weight 3 fix the stopper pins 4 to the weight 3.

Before the sensor is put in use or when it is not in use, the sensor is handled in such a manner that the stopper pins 4 remain inserted in the pin holes 11 and the pin fixation holes 12 to prevent pressure from exerting force on the pressure-sensitive sheets 6a and 6b.

When the detector is attached to a cargo or the like so that the detector is put in use, the stopper pins 4 are pulled out of the holes 11 and 12. As a result, the impact block 9 can move in two mutually opposed directions in the container 10. If an external force acts on the detector, an acceleration in at least one of the directions is given to the impact block 9 so that the conical projection 7 and triangular pyramidal projections 8 of the elastic member 2a or 2b exert impulsive pressure on the pressure-sensitive sheet 6a or 6b because of the mass of the weight 3.

Figure 3:
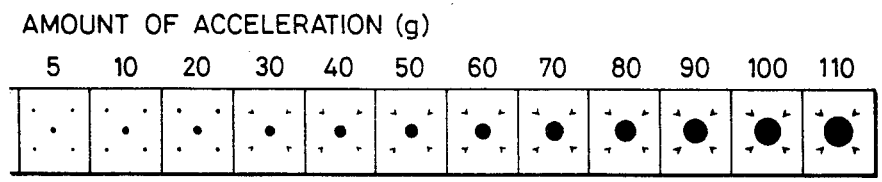
FIG. 3 shows the colored areas of the pressuresensitive sheet of the detector at accelerations.

FIG. 3 shows the colored areas of a pressure-sensitive sheet (which is made by Fuji Photo Film Co., Ltd.) which is set in the bidirectional shock sensor and for which accelerations of 5g, 10g, 30g, 40g, 50g, 60g, 70g, 80g, 90g, 100g and 110g are applied to the detector to exert pressure on the sheet.

What is claimed is:

1. A bidirectional shock sensor, comprising:
   a container;
   an impact block slidably fitted within and along first walls of said container;
   elastic members fixed on ends of said impact block facing opposed second walls of said container; and
   pressure-sensitive color-changing sheets attached to said second walls and selectively contactable with said elastic members.

2. A shock sensor as recited in claim 1, wherein each said pressure-sensitive sheet comprises a color former containing sheet and a developer sheet having a transparent carrier and wherein said second walls of said container are transparent.

3. A shock sensor as recited in claim 2, wherein said elastic members include projections including a central conical projection and four surrounding triangular projections.

4. A shock sensor as recited in claim 3, further comprising removable stopper pins detachably connectable between said container and said impact block.

5. A bidirectional shock sensor, comprising:
   a container;
   an impact block slidably provided within and along first walls of said container;
   elastic members provided on ends of said impact block facing opposed second walls of said container;
   pressure-sensitive sheets attached to said second walls; and
   removable stopper pins detachably connectable between said container and said impact block

* * * * *